(12) United States Patent
Cui

(10) Patent No.: US 12,510,505 B2
(45) Date of Patent: Dec. 30, 2025

(54) SENSOR ARRAY DEVICE AND MANUFACTURING METHOD THEREFOR

(71) Applicant: Peking University, Beijing (CN)

(72) Inventor: Yue Cui, Beijing (CN)

(*) Notice: Subject to any disclaimer, the term of this patent is extended or adjusted under 35 U.S.C. 154(b) by 329 days.

(21) Appl. No.: 17/994,023

(22) Filed: Nov. 25, 2022

(65) Prior Publication Data

US 2023/0168218 A1    Jun. 1, 2023

(30) Foreign Application Priority Data

Nov. 26, 2021  (CN) .......................... 202111424297.0
Nov. 26, 2021  (CN) .......................... 202111424976.8

(51) Int. Cl.
*G01N 27/327*    (2006.01)

(52) U.S. Cl.
CPC ............................... *G01N 27/3272* (2013.01)

(58) Field of Classification Search
CPC ........... G01N 27/3272; G01N 27/3273; G01N 27/327; G01N 27/307; G01N 27/3271
See application file for complete search history.

(56) References Cited

U.S. PATENT DOCUMENTS

| | | | |
|---|---|---|---|
| 2011/0144915 A1* | 6/2011 | Rodgers | G01N 27/3274 702/19 |
| 2017/0191955 A1* | 7/2017 | Zou | C12N 11/089 |
| 2021/0131996 A1* | 5/2021 | Kumar | G01N 27/3272 |

* cited by examiner

*Primary Examiner* — Gurpreet Kaur

(57) ABSTRACT

A sensor array device includes a substrate and electrodes. The electrodes include a power electrode located in a first region of the substrate and a plurality of working electrodes located in a second region of the substrate. Surfaces of the working electrodes have various specific enzymes, respectively, and the specific enzymes on the surfaces of the working electrodes are different. The plurality of working electrodes are located in different sub-regions of the second region, respectively. The sensor array device further includes a guide layer or a hydrophilic layer. The guide layer is located above the electrodes and covers the first region and the second region. An edge of the guide layer extends to an edge of the substrate. The hydrophilic layer is arranged on the substrate and covers the first region and the second region, and an edge of the hydrophilic layer extends to the edge of the substrate.

13 Claims, 17 Drawing Sheets

SENSOR ARRAY DEVICE AND MANUFACTURING METHOD THEREFOR

CROSS REFERENCE TO THE RELATED APPLICATIONS

This application is based upon and claims priority to Chinese Patent Applications No. 202111424297.0 and No. 202111424976.8, both filed on Nov. 26, 2021, the entire contents of which are incorporated herein by reference.

TECHNICAL FIELD

The present invention relates to the technical field of electrochemical analysis, and particularly relates to a sensor array device and a manufacturing method therefor.

BACKGROUND

A basic structural unit of an electrochemical enzyme sensor array, namely an enzyme sensor array, consists of a substance recognition element array (an immobilized enzyme membrane array) and a signal converter array (matrix electrodes). When an enzymatic reaction occurs on the enzyme membrane, the corresponding electrode responds to a generated electroactive substance. The matrix electrodes act to convert chemical signals into electric signals for detection.

At present, a sensor array usually includes a plurality of working electrodes. Different specific enzymes are immobilized on to the plurality of working electrodes, respectively, and different specific enzymes can catalyze the corresponding analytes in a liquid to react and generate products that can be oxidized or reduced by the working electrodes to generate signal responses. Therefore, the sensor array can detect different compositions in the liquid to be tested.

However, as the products obtained by the reactions of the analytes catalyzed by different specific enzymes may be the same and all the working electrodes are located on a same substrate, when the spacing between different working electrodes is very small, there may be interference between different working electrodes, resulting in errors in the sensing results of the compositions in the liquid.

SUMMARY

The objective of the present invention is to provide a sensor array device for reducing mutual interference between the working electrodes and improving the accuracy of the detection results.

In order to achieve the above objective, the present invention provides a sensor array, including a substrate and electrodes arranged on the substrate;

the electrodes include a power electrode and a plurality of working electrodes, where the power electrode is located in a first region of the substrate; the plurality of working electrodes are located in a second region of the substrate; specific enzymes are immobilized on the surfaces of the plurality of working electrodes, respectively, and the specific enzymes on different working electrodes correspond to different analytes;

the second region includes a plurality of sub-regions, where the plurality of sub-regions are independent of each other on the substrate, and the plurality of working electrodes are located in different sub-regions, respectively;

the sensor array device disclosed by the present invention further includes a guide layer or a hydrophilic layer;

the guide layer is made of a paper material, is located above the electrodes and covers the first region and the second region, and an edge of the guide layer extends to an edge of the substrate; and the hydrophilic layer is arranged on the substrate and covers the first region and the second region, and an edge of the hydrophilic layer extends to the edge of the substrate; and the hydrophilic layer is surrounded by a hydrophobic layer, and the hydrophobic layer is arranged on the substrate.

Preferably, the plurality of working electrodes are located on one side or two sides of the power electrode;

or the plurality of working electrodes are evenly spaced along the circumference of the power electrode.

Preferably, the power electrode includes a counter electrode that also functions as a reference electrode.

Preferably, the power electrode includes a counter electrode and a reference electrode.

The guide layer is made of filter paper, chromatography paper or blotting paper.

Preferably, the width of the guide layer located in the second region is 10 $\mu$m-5 mm.

Preferably, the material of the hydrophilic layer includes carboxyl-containing silane.

Preferably, the material of the hydrophobic layer includes fluorine- or chlorine-containing silane and insulating paste.

Preferably, the sensor array device provided by the present invention further includes a protective layer, where the protective layer is above the hydrophilic layer and the hydrophobic layer on the substrate, and both sides of the protective layer are connected to the substrate.

A method for manufacturing a sensor array device, where the method includes:

providing a substrate;

forming a power electrode and a plurality of working electrodes on the substrate by means of a printing technology, and drying the power electrode and the plurality of working electrodes;

covering leads of the power electrode and the plurality of working electrodes with insulating paste to form an insulating layer, and drying the insulating layer;

printing specific enzymes on the plurality of working electrodes by means of the printing technology, and drying the working electrodes; and covering the power electrode and the plurality of working electrodes with a guide layer.

A method for manufacturing a sensor array device, where the method includes:

providing a substrate;

forming a power electrode and a plurality of working electrodes on the substrate by means of a printing technology, and drying the power electrode and the plurality of working electrodes, where a signal end of the power electrode and signal ends of the plurality of working electrodes are located in a first region and a second region of the substrate, respectively;

covering leads of the power electrode and the plurality of working electrodes with insulating paste to form an insulating layer, and drying the insulating layer;

forming a hydrophilic layer on the substrate, where the hydrophilic layer covers the first region and the second region, and an edge of the hydrophilic layer extends to an edge of the substrate;

forming a hydrophobic layer on the substrate, where the hydrophilic layer is surrounded by the hydrophobic layer; and printing the corresponding specific enzymes onto the plurality of working electrodes by means of the printing technology, and drying the working electrodes.

Preferably, the forming the hydrophilic layer on the substrate includes:

treating the substrate with an oxygen plasma to generate OH radicals, so as to form the hydrophilic layer.

The present invention has the beneficial effects:

1. As the counter electrode, the reference electrode and the plurality of working electrodes are arranged on the substrate, and the counter electrode and the reference electrode are located in the first region on the substrate, the working electrodes are located in the second region on the substrate, and meanwhile, the working electrodes are located in different sub-regions in the second region. As the working electrodes are located in different sub-regions and the sub-regions are independent of each other, the reactants generated by the specific enzyme reactions cannot be directly moved to positions of other working electrodes, so that interference between the different working electrodes is reduced, and the accuracy of sensor detection is improved.

2. The paper guide layer is then arranged on the substrate, so that the guide layer fully covers the first region and the second region of the substrate; during detection by means of the sensor array device, a liquid drop to be tested enters the guide layer from the edge of the substrate. Due to diffusivity of the liquid on the paper material, the liquid will diffuse in the guide layer and finally into the guide layer located in each sub-region of the second region. At this time, the specific enzymes on the working electrodes will react with corresponding analyte in the liquid.

Or, the hydrophilic layer and the hydrophobic layer are further arranged on the substrate, and the hydrophilic layer covers the reaction region. When using the sensor array device for detection, the liquid to be tested enters the hydrophilic layer of the first region. Due to hydrophilicity of the hydrophilic layer, the liquid diffuses on the hydrophilic layer and finally diffuse to each second region. At this time, the specific enzymes on the working electrodes will react with corresponding analyte in the liquid. The hydrophobic layer can further prevent the liquid to be tested from diffusing to other locations.

The technical solution of the present invention will be further described in detail below in combination with the drawings and the embodiments.

Figure 1:
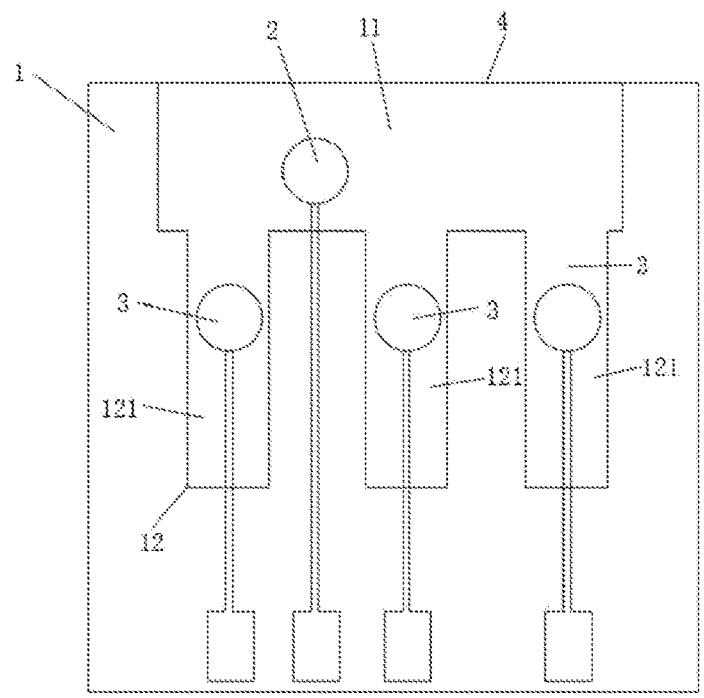
FIG. 1 is a schematic diagram of a top view structure of a sensor array device provided by Solution I of the present application.

Numeral description in the drawings: 1. substrate; 11. first region; 12. second region; 121. sub-region; 2. power electrode; 21. counter electrode; 22. reference electrode; 3. working electrode; 4. guide layer; 5. insulating layer; 6. hydrophilic layer. 7. hydrophobic layer; 8. protective layer; 81. hydrophilic layer; 82. hydrophobic layer; and A. reaction region.

DETAILED DESCRIPTION OF THE EMBODIMENTS

The present invention will be further described below in combination with the drawings. It is to be noted that based on the premise of the technical solution, the present invention provides detailed embodiments and specific operating processes. But the protection scope of the present invention is not limited to the embodiments.

Solution I

Embodiment I

As shown in FIG. 1, FIG. 1 shows a sensor array device disclosed by the embodiment of the present application, including a substrate 1 and electrodes arranged on the substrate 1. The sensor array device disclosed by the embodiment of the present application is mainly intended to detect various compositions in a liquid.

Specifically, the substrate 1 can be made from a polyester resin material or a polyimide material.

Figure 2:
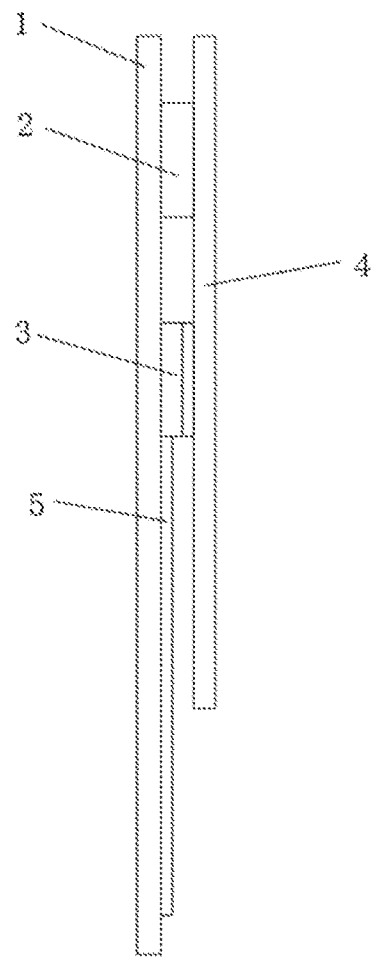
FIG. 2 is a schematic diagram of a side structure of a sensor array device provided by Solution I of the present application.

As shown in FIG. 1, the electrodes include a power electrode 2 and a plurality of working electrodes 3. The power electrode 2 serves to form a circuit and stabilize the potential. Moreover, there are specific enzymes on the surface of each working electrode 3 that can react with a corresponding analyte in the liquid to be tested to generate a product, and the product will be further subjected to an oxidation or reduction reaction on the working electrode 3 on the corresponding sensor to change the electric signal; meanwhile, the specific enzymes on the working electrodes 3 are different, and thus, various compositions in the liquid can be detected by one sensor, so that the detection efficiency of the sensor can be effectively improved; and of course, one composition can be also detected by means of the sensor, and thus, the sensors based on the plurality of working electrodes 3 all will change the electric signals, so that the calculated statistical detection result is more accurate. As shown in FIG. 2, the leads of the power electrode 2 and the working electrodes 3 are covered with an insulating layer 5.

Specifically, as shown in FIG. 1, the substrate 1 includes a first region 11 and a second region 12. The power electrode is located in the first region 11 of the substrate 1, and the working electrodes 3 are located in the second region 12 of the substrate 1. It is to be noted that the first region 11 and the second region 12 are not specific spaces formed on the substrate 1 but a kind of division of the substrate 1 itself. The sizes of the first region 11 and the second region 12 are set according to an actual demand.

Further, as shown in FIG. 1, the second region 12 further includes a plurality of sub-regions 121 which are independent of each other, i.e., on the substrate 1, the sub-regions 121 are isolated and irrelevant in position, and the sizes of the sub-regions 121 can be either same or different; and the sub-regions 121 correspond to the working electrodes 3 in quantity, and each working electrode 3 is located in one sub-region 121.

As shown in FIG. 1, the sensor further includes a guide layer 4 which is made of a paper material. The paper material itself is a porous material. After a liquid to be tested is dropped to the guide layer 4, the guide layer 4 made of the paper material will generate a capillary force to the liquid to be tested, so that the liquid to be tested can diffuse on the guide layer 4. The width of the guide layer located in the second region is 10 μm-5 mm.

FIG. 2 shows a side schematic structural diagram of the sensor array device. As shown in FIG. 2, the guide layer 4 is located above the power electrode 2 and the working electrodes 3, and the guide layer 4 covers the first region 11 and the second region 12 of the substrate 1. As shown in FIG. 1, the integral shape of the guide layer 4 is the same as the shape formed by the first region 11 and the second region 12, and the area of the guide layer 4 further corresponds to the area including the first region 11 and the second region 12. Furthermore, an edge of the guide layer 4 extends to an edge of the substrate 1, so that the liquid to be tested can enter the guide layer 4 therefrom.

It is to be noted that FIG. 2 is merely a schematic diagram of the structure of the sensor array device. In an actual application, thicknesses of the power electrode 2, the working electrodes 3 and the guide layer 4 all are micron levels. Therefore, the guide layer 4 actually clings to the substrate 1.

During use of the sensor array device, the liquid to be tested enters the guide layer 4 from the edge of the substrate 1. As the liquid diffuses by itself on the guide layer 4, the liquid will gradually diffuse to the guide layer 4 in each sub-region 121 in the second region 12 from the guide layer 4 located in the first region 11. When the liquid to be tested diffuses to the position of the electrode detecting end of each working electrode 3, corresponding compositions in the liquid to be tested will react with different specific enzymes on each working electrode 3. The working electrode 3 will generate the electric signal due to the products generated by the specific enzymes and the corresponding compositions in the liquid to be tested, so that various compositions in the liquid to be tested are detected. Of course, when there are no compositions reacted with certain specific enzymes in the liquid to be tested, the corresponding working electrodes 3 will not generate the electric signals.

As the sub-regions 121 are independent of each other and each sub-region 121 is covered with the guide layer 4, the reactants generated by the specific enzymes and the corresponding compositions in the liquid to be tested cannot move to positions of other working electrodes 3 easily through the guide layers 4. Thus, even though the reactants generated by different specific enzyme reactions are same, interference between the working electrodes 3 will also be reduced, so that the accuracy of the detection result is improved.

During a specific application, the guide layer 4 can be fixed to the substrate 1 by way of glue adhesion, and the guide layer 4 is integrally formed by cutting.

In an embodiment, the guide layer 4 can be made of filter paper, chromatography paper or blotting paper.

The filter paper, chromatography paper or blotting paper allows better spreading of the liquid on the guide layer 4 due to its high water absorption.

An electrode material for the working electrode 3 can be gold, platinum and carbon or a composite material containing gold, platinum or carbon.

There are two circumstances for the power electrode 2.

Figure 7:
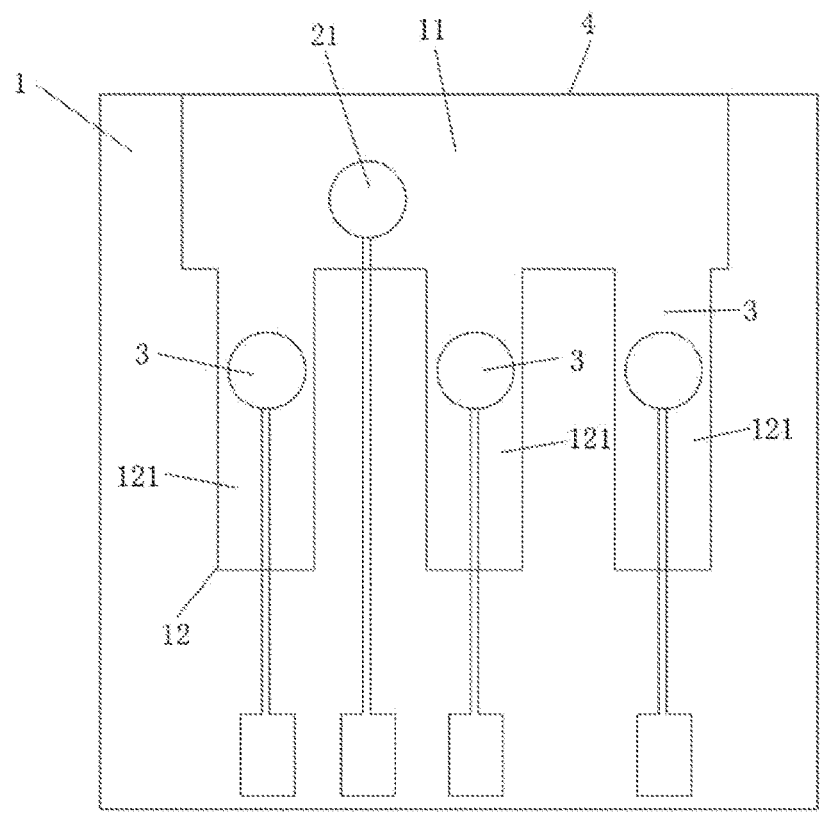
FIG. 7 is a schematic diagram of a top view structure of another sensor array device provided by Solution I of the present application.

As shown in FIG. 7, under the first circumstance, the power electrode 2 only includes a counter electrode 21, which can simultaneously serves to form a circuit and stabilize the potential. At this time, a material for the counter electrode 21 is Ag/AgCl, where the ratio of silver to silver chloride is 1:1, 6:4 or 7:3.

Figure 3:
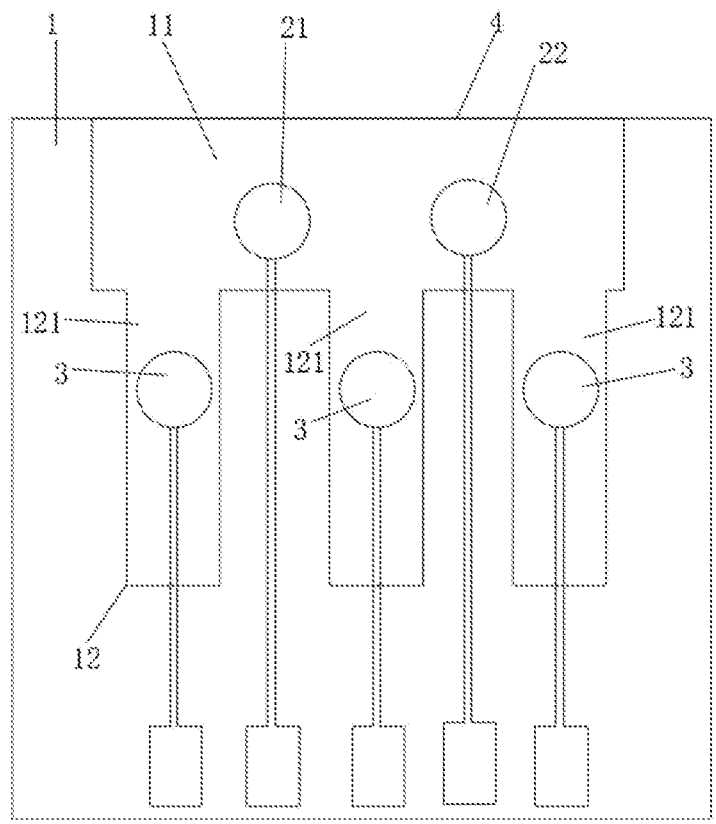
FIG. 3 is a schematic diagram of a top view structure of another sensor array device provided by Solution I of the present application.

As shown in FIG. 3, under the second circumstance, the power electrode 2 includes the counter electrode 21 and the reference electrode 22, where the counter electrode 21 serves to form a circuit and the reference electrode 22 serves to stabilize the potential. At this time, a material for the counter electrode 21 is the same as the material for the working electrode 3.

An electrode material for the reference electrode 22 is Ag/AgCl, where the ratio of silver to silver chloride is 1:1, 6:4 or 7:3.

The plurality of working electrodes are located on one side of two sides of the power electrode; or, the plurality of working electrodes are evenly spaced along the circumference of the power electrode.

In an embodiment, as shown in FIG. 3, the power electrode 2 includes the counter electrode 21 and the reference electrode 22. There are totally three working electrodes 3. The electrode detecting ends of the three working electrodes 3 are located on the same straight line on the substrate 1, and correspondingly, three sub-regions 121 are formed on the substrate 1. Each sub-region 121 is strip-like, and the three strip-like sub-regions 121 are parallel to each other.

Figure 4:
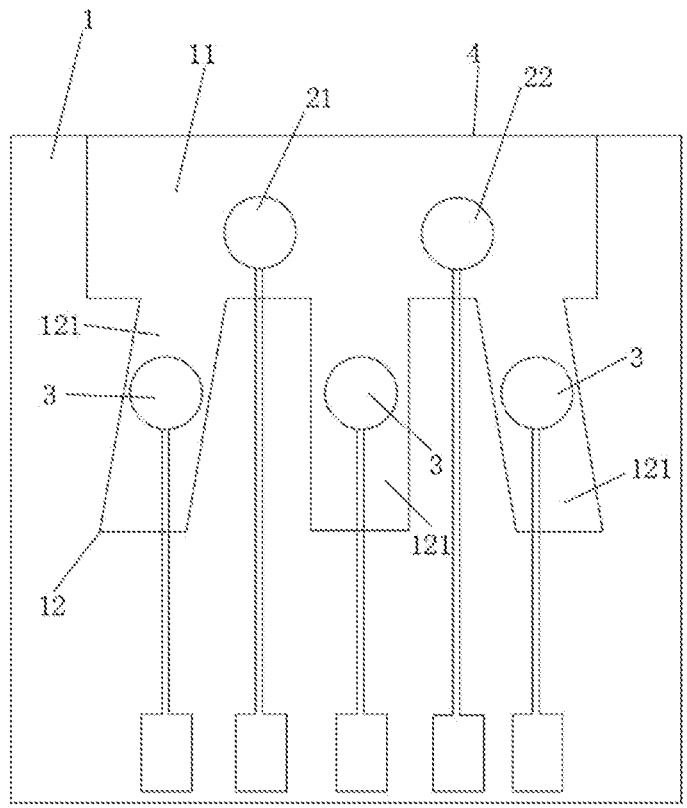
FIG. 4 is a schematic diagram of a top view structure of another sensor array device provided by Solution I of the present application.

In an embodiment, as shown in FIG. 4, the power electrode includes the counter electrode 21 and the reference electrode 22. There are totally three working electrodes 3. The electrode detecting ends of the three working electrodes 3 are located on the same straight line on the substrate 1, and correspondingly, three sub-regions 121 are formed on the substrate 1. However, the sub-regions 121 are different either in shape or in position.

Figure 5:
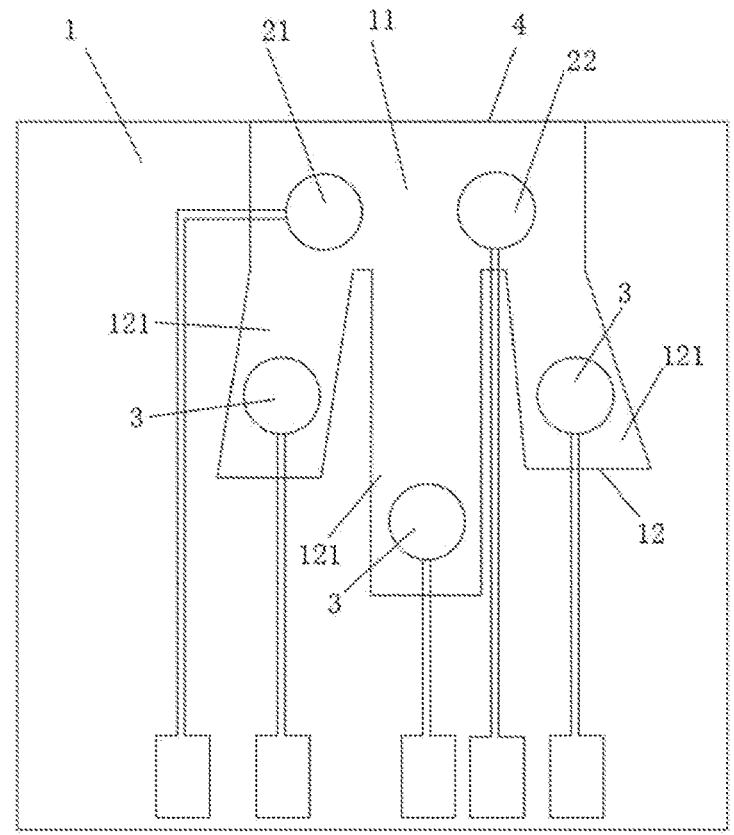
FIG. 5 is a schematic diagram of a top view structure of another sensor array device provided by Solution I of the present application.

In an embodiment, as shown in FIG. 5, the power electrode 2 includes the counter electrode 21 and the reference electrode 22. There are totally three working electrodes 3. The electrode detecting ends of the three working electrodes 3 are located in different positions of the substrate 1, and correspondingly, three sub-regions 121 are formed on the substrate 1. The three sub-regions 121 are different both in shape and in position.

Figure 6:
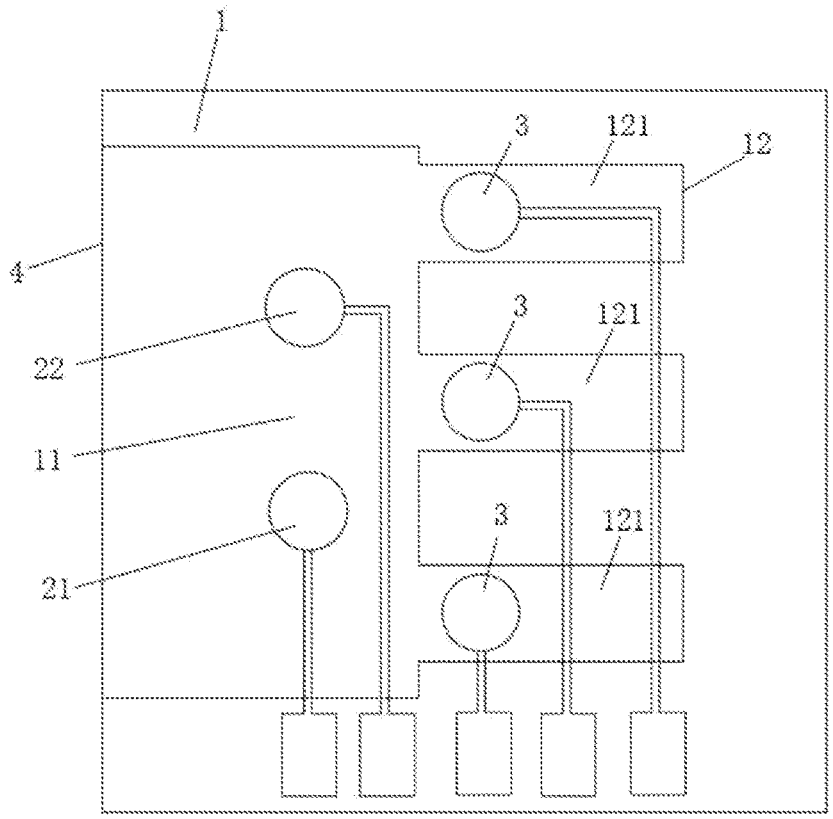
FIG. 6 is a schematic diagram of a top view structure of another sensor array device provided by Solution I of the present application.

In an embodiment, as shown in FIG. 6, the counter electrode 21, the reference electrode 22 and the working electrodes 3 can further be arranged on the substrate 1 along a vertical direction.

In an embodiment, as shown in FIG. 7, the power electrode 2 only includes the counter electrode 21. There are totally three working electrodes 3. The electrode detecting ends of the three working electrodes 3 are located on the same straight line on the substrate 1, and correspondingly, three sub-regions 121 are formed on the substrate 1. Each sub-region 121 is strip-like, and the three strip-like sub-regions 121 are parallel to each other.

Figure 8:
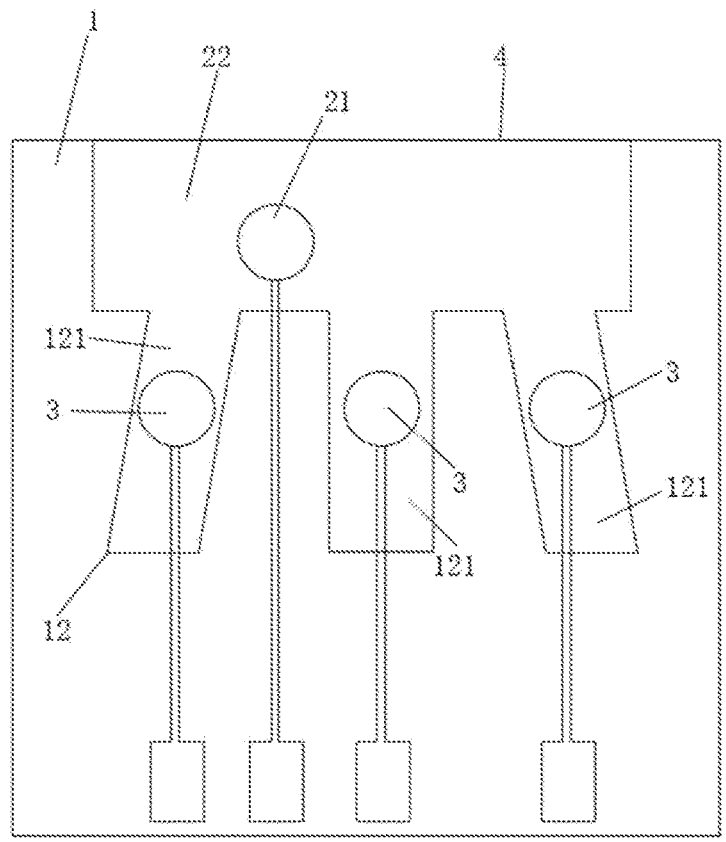
FIG. 8 is a schematic diagram of a top view structure of another sensor array device provided by Solution I of the present application.

In an embodiment, as shown in FIG. 8, the power electrode 2 only includes the counter electrode 21. There are totally three working electrodes 3. The electrode detecting ends of the three working electrodes 3 are located on the same straight line on the substrate 1, and correspondingly, three sub-regions 121 are formed on the substrate 1. However, the sub-regions 121 are different either in shape or in position.

Figure 9:
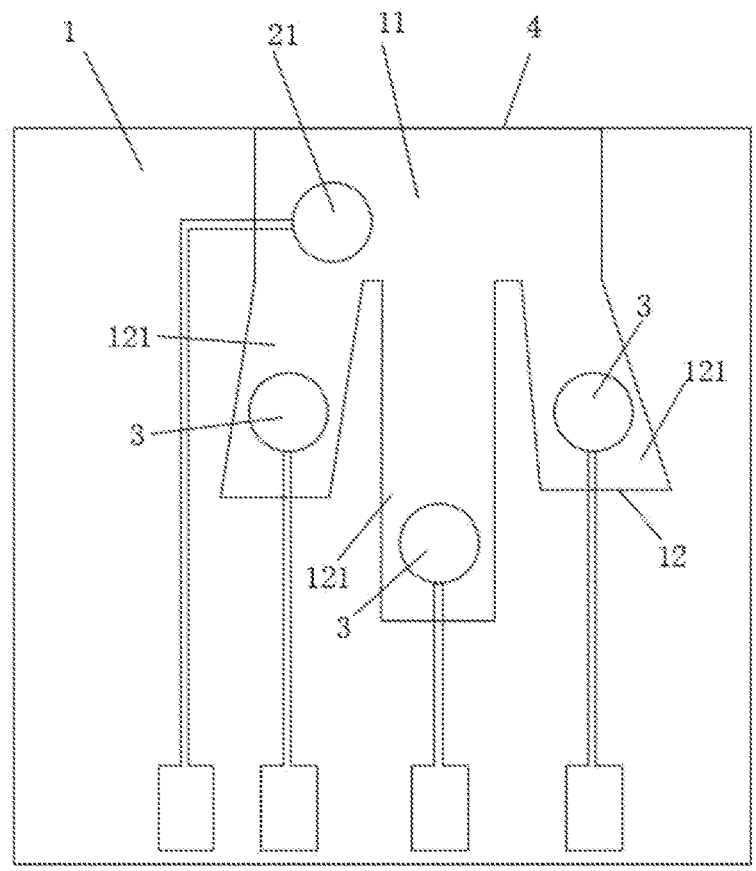
FIG. 9 is a schematic diagram of a top view structure of another sensor array device provided by Solution I of the present application.

In an embodiment, as shown FIG. 9, the power electrode 2 only includes the counter electrode 21. There are totally three working electrodes 3. The detecting ends of the three working electrodes 3 are located in different locations of the substrate 1, and correspondingly, three sub-regions 121 are formed on the substrate 1. The three sub-regions 121 are different either in shape or in position.

Figure 10:
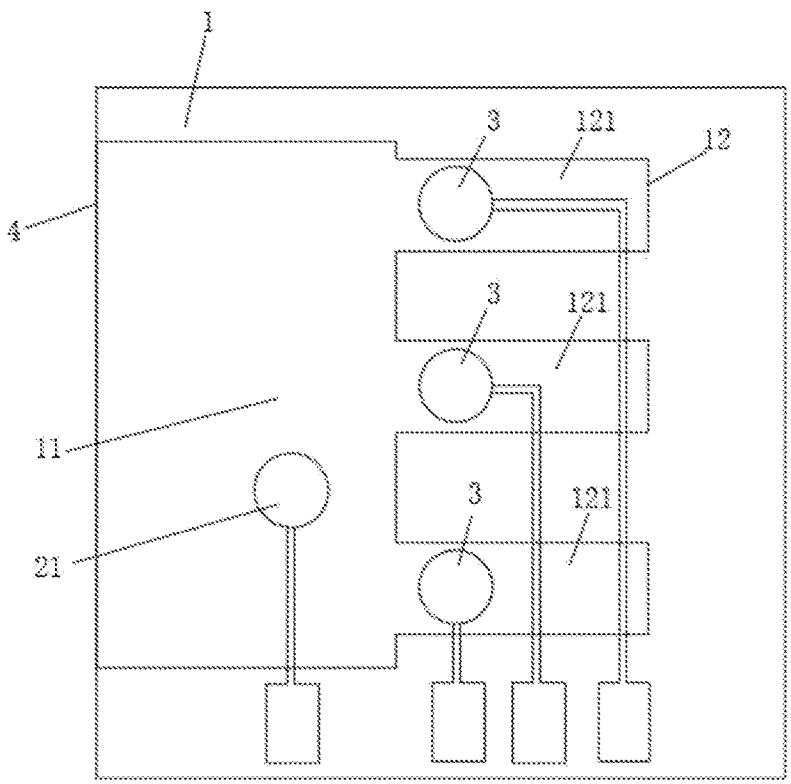
FIG. 10 is a schematic diagram of a top view structure of another sensor array device provided by Solution I of the present application.

In an embodiment, as shown in FIG. 10, the power electrode 2 only includes the counter electrode 21. There are totally three working electrodes 3, and the three working electrodes 3 are arranged on the substrate 1 along the vertical direction.

Figure 11:
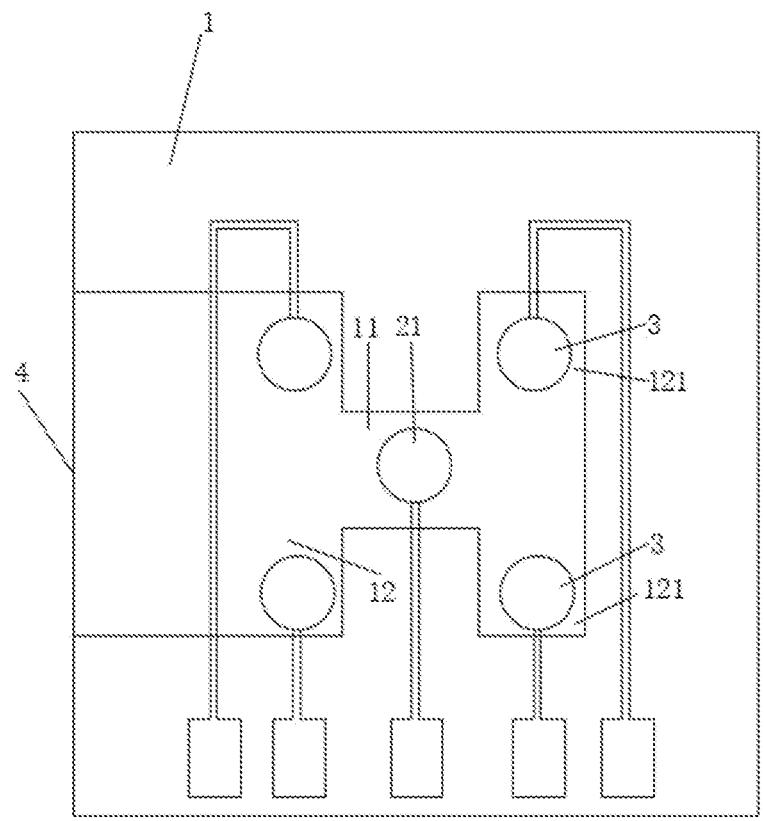
FIG. 11 is a schematic diagram of a top view structure of another sensor array device provided by Solution I of the present application.

In an embodiment, as shown in FIG. 11, the power electrode 2 only includes the counter electrode 21. There are totally four working electrodes 3, and the four working electrodes 3 are located on two sides of the counter electrode 21, respectively.

Figure 12:
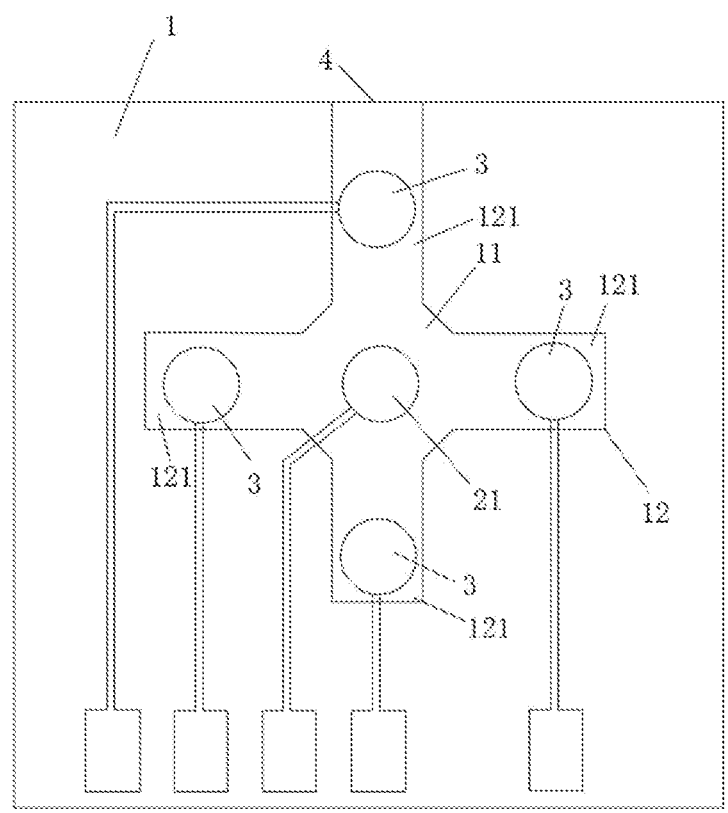
FIG. 12 is a schematic diagram of a top view structure of another sensor array device provided by Solution I of the present application.

In an embodiment, as shown in FIG. 12, the power electrode 2 only includes the counter electrode 21. There are totally four working electrodes 3, and the four working electrodes 3 are evenly distributed along the circumstance of the counter electrode 21.

Figure 13:
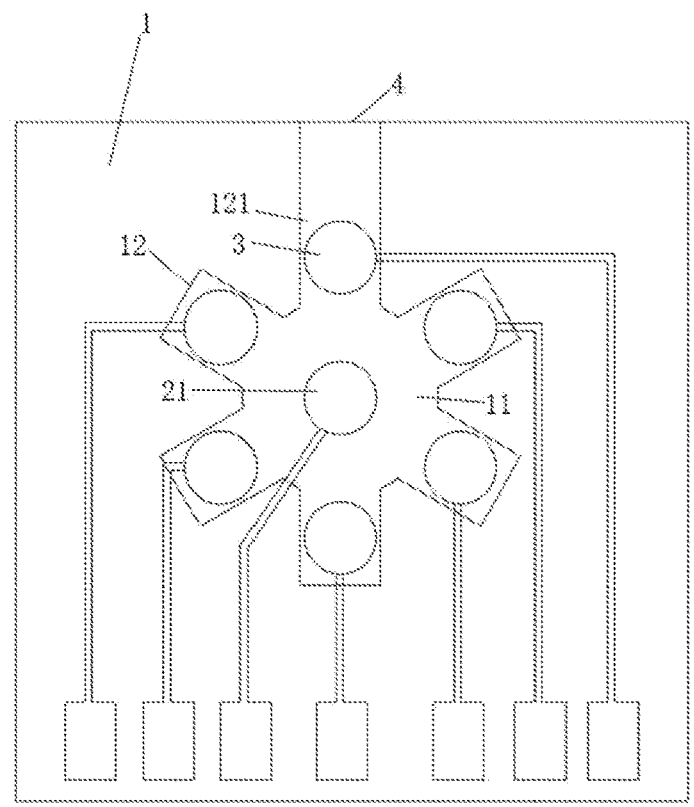
FIG. 13 is a schematic diagram of a top view structure of another sensor array device provided by Solution I of the present application.

In an embodiment, as shown FIG. 13, the power electrode 2 only includes the counter electrode 21. There are totally six working electrodes 3, and the six working electrodes 3 are evenly distributed along the circumstance of the counter electrode 21.

Figure 14:
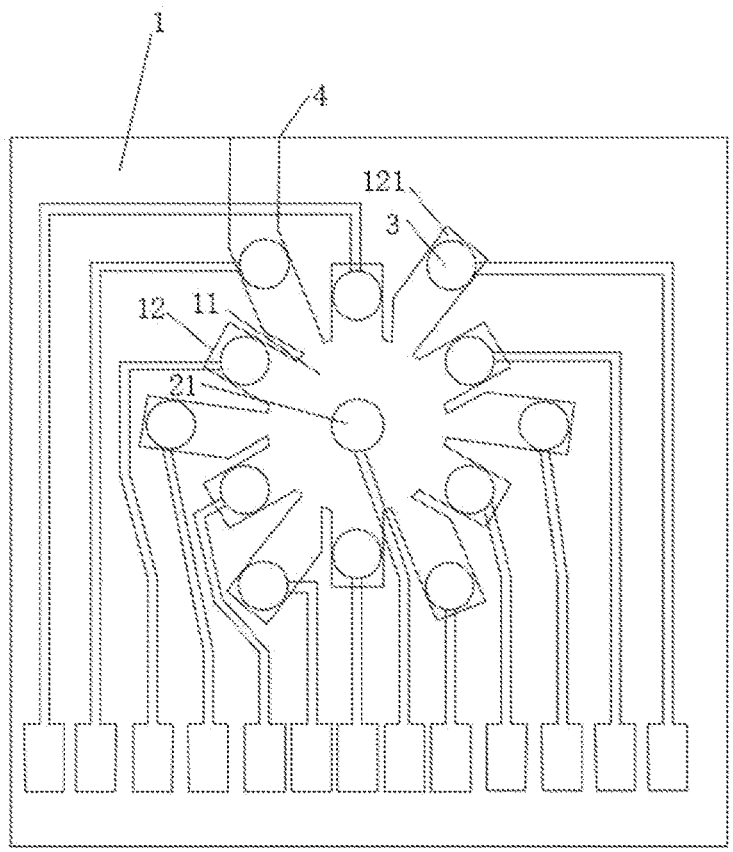
FIG. 14 is a schematic diagram of a top view structure of another sensor array device provided by Solution I of the present application.

In an embodiment, as shown in FIG. 14, the power electrode 2 only includes the counter electrode 21. There are totally twelve working electrodes 3, and the twelve working electrodes 3 in two circles are evenly distributed along the circumstance of the counter electrode 21.

In other embodiments, the working electrodes 3 can further be arranged in three circles, four circles or more circles.

Figure 15:
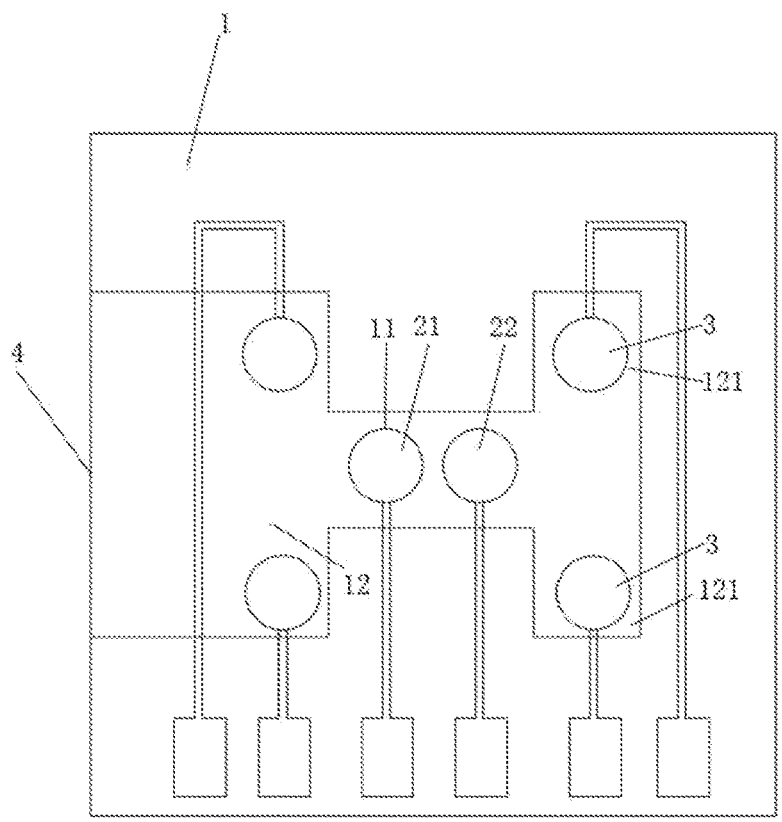
FIG. 15 is a schematic diagram of a top view structure of another sensor array device provided by Solution I of the present application.

In an embodiment, as shown in FIG. 15, the power electrode 2 includes the counter electrode 21 and the reference electrode 22. There are totally four working electrodes 3, and the four working electrodes 3 are located on two sides of the counter electrode 21 and the reference electrode 22, respectively.

Figure 16:
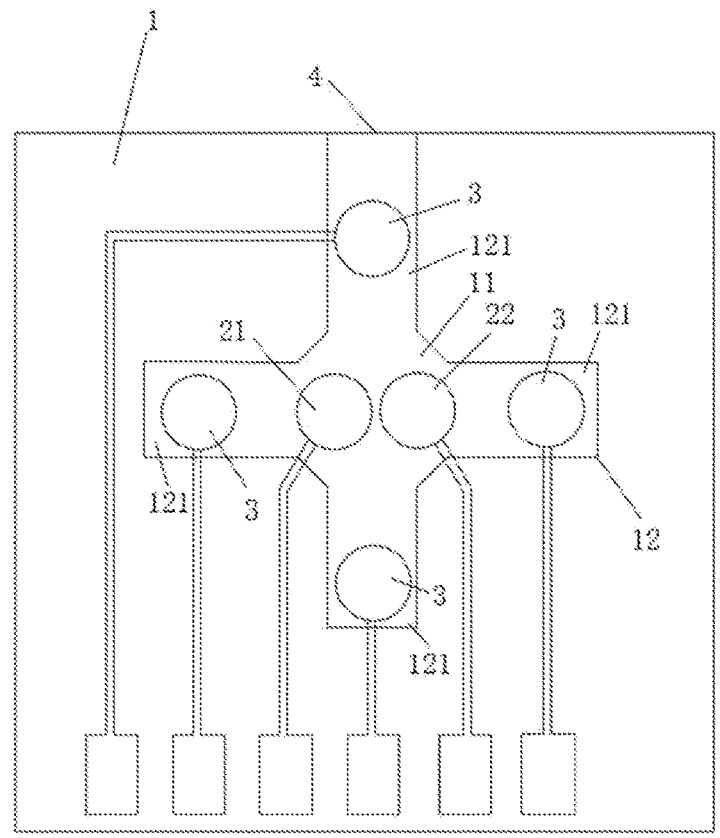
FIG. 16 is a schematic diagram of a top view structure of another sensor array device provided by Solution I of the present application.

In an embodiment, as shown in FIG. 16, the power electrode 2 includes the counter electrode 21 and the reference electrode 22. There are totally four working electrodes 3, and the four working electrodes 3 are evenly distributed along the circumstances of the counter electrode 21 and the reference electrode 22.

Figure 17:
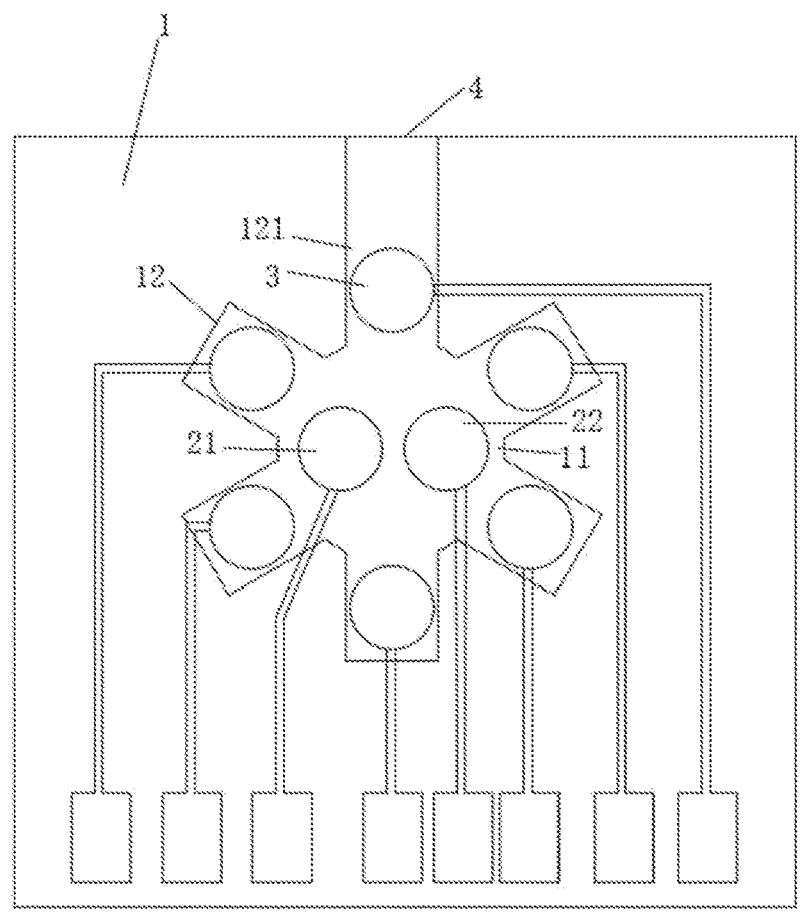
FIG. 17 is a schematic diagram of a top view structure of another sensor array device provided by Solution I of the present application.

In an embodiment, as shown in FIG. 17, the power electrode 2 includes the counter electrode 21 and the reference electrode 22. There are totally six working electrodes 3, and the six working electrodes 3 are evenly distributed along the circumstances of the counter electrode 21 and the reference electrode 22.

Figure 18:
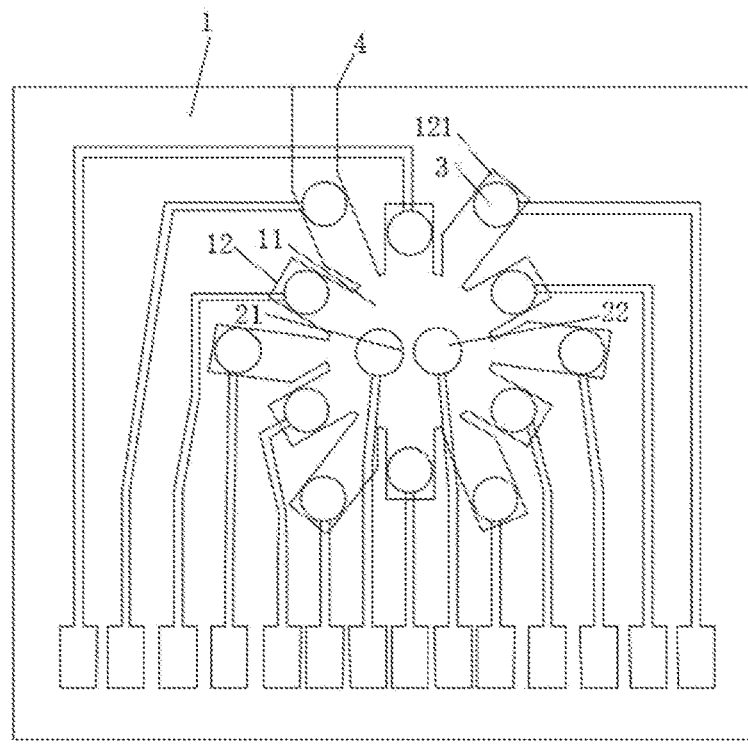
FIG. 18 is a schematic diagram of a top view structure of another sensor array device provided by Solution I of the present application.

In an embodiment, as shown in FIG. 18, the power electrode 2 includes the counter electrode 21 and the reference electrode 22. There are totally twelve working electrodes 3, and the twelve working electrodes 3 in two circles are evenly distributed along the circumstances of the counter electrode 21 and the reference electrode 22.

It is to be noted that during the actual application, the region of the guide layer 4 occupies about 1/5 of the area of the entire substrate 1, the guide layer 4 is located above the substrate 1, and the substrate 1 is often slender in size, thereby facilitating diffusion of the liquid on the guide layer 4.

Embodiment II

Figure 19:
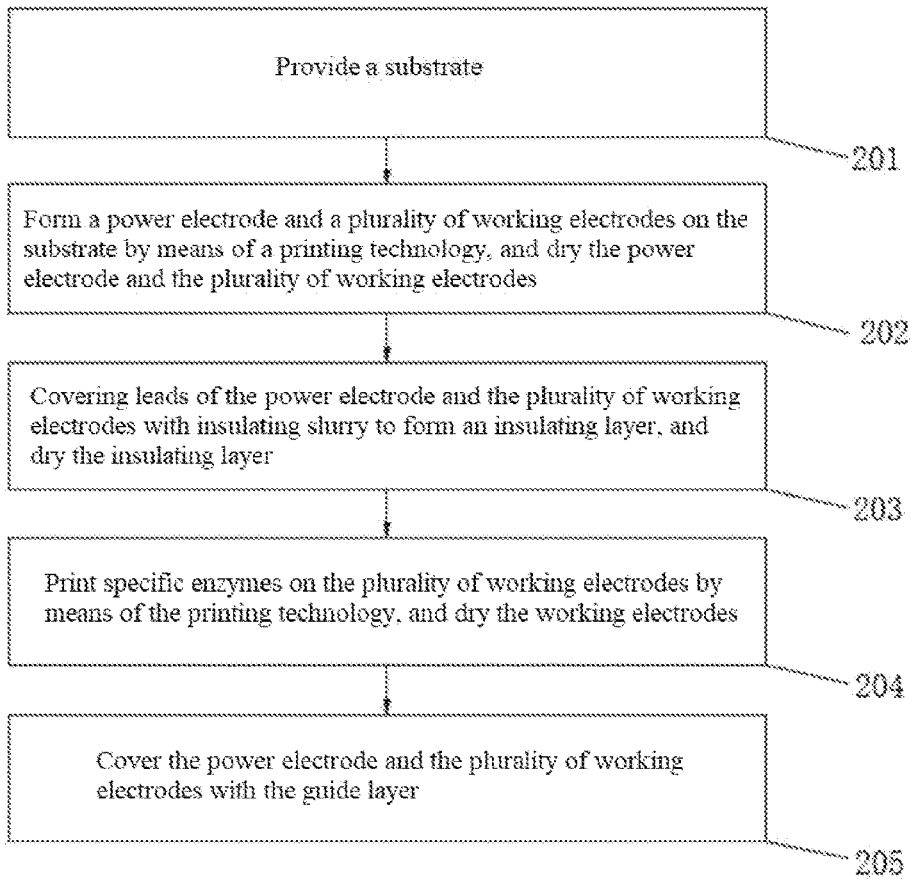
FIG. 19 is a step flowchart of a method for manufacturing a sensor array device provided by Solution I of the present application.

FIG. 19 shows a method for manufacturing a sensor array device. As shown in FIG. 19, the embodiment of the present application provides a method for manufacturing a sensor array device, including:

S201: a substrate 1 is provided.

S202: a power electrode 2 and a plurality of working electrodes 3 are formed on the substrate 1 by means of a printing technology, and the power electrode and the plurality of working electrodes are dried.

Specifically, the printing technology can be screen printing. During printing of the power electrode 2 and the working electrodes 3, an arrangement mode and positions of the power electrode 2 and the working electrodes 3 can be set as required, and drying can be hot air drying or moisture absorbing drying.

S203: leads of the power electrode 2 and the plurality of working electrodes 3 are covered with insulating paste to form an insulating layer 5, and the insulating layer is dried.

Specifically, the insulating paste can be an epoxy resin, and the insulating layer 5 acts as a protection for the electrodes.

S205: specific enzymes are printed on the plurality of working electrodes 3 by means of the printing technology, and the working electrodes are dried.

S206: the power electrode 2 and the plurality of working electrodes 3 are covered with the guide layer 4.

Figure 20:
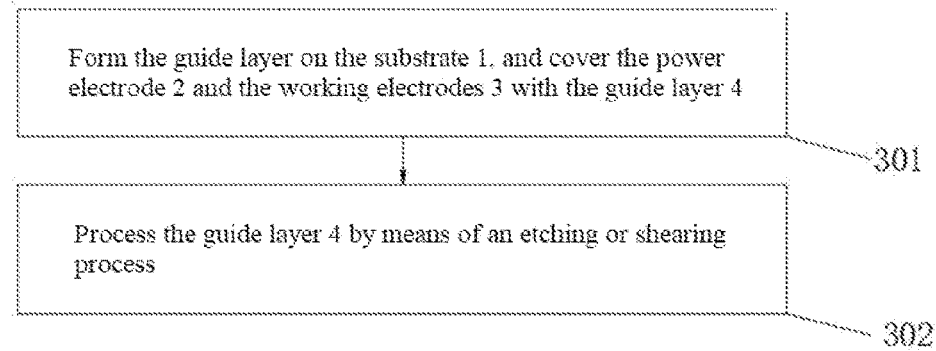
FIG. 20 is a step flowchart of a method for manufacturing a guide layer provided by Solution I of the present application.

In an embodiment, as shown in FIG. 20, the step that the power electrode 2 and the working electrodes are covered with the guide layer 4 includes:

S301: the guide layer 4 is formed on the substrate 1, and the guide layer 4 covers the power electrode 2 and the working electrodes 3.

Specifically, the guide layer 4 can be fixedly connected to the substrate 1 by way of adhesion.

S302: the guide layer 4 is processed by means of an etching or shearing process.

Specifically, the guide layer 4 is etched or sheared, so that the shape of the guide layer 4 is the same as the shape formed by the first region 11 and the second region 12. Thus, the guide layer 4 can better guide the liquid to diffuse towards a predetermined position.

Figure 21:
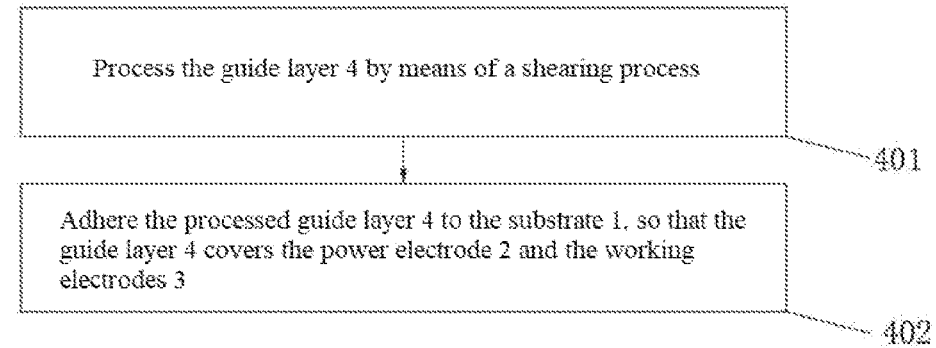
FIG. 21 is a step flowchart of a method for manufacturing another guide layer provided by Solution I of the present application.

In an embodiment, as shown in FIG. 21, the step that the power electrode 2 and the working electrodes 3 are covered with the guide layer 4 includes:

S401: the guide layer 4 is processed by means of a shearing process.

Specifically, the shape of the guide layer 4 is processed to be the same as the shape formed by the first region 11 and the second region 12.

S404: the processed guide layer 4 is adhered to the substrate 1, so that the guide layer 4 covers the power electrode 2 and the working electrodes 3.

Solution II

Embodiment III

Figure 22:
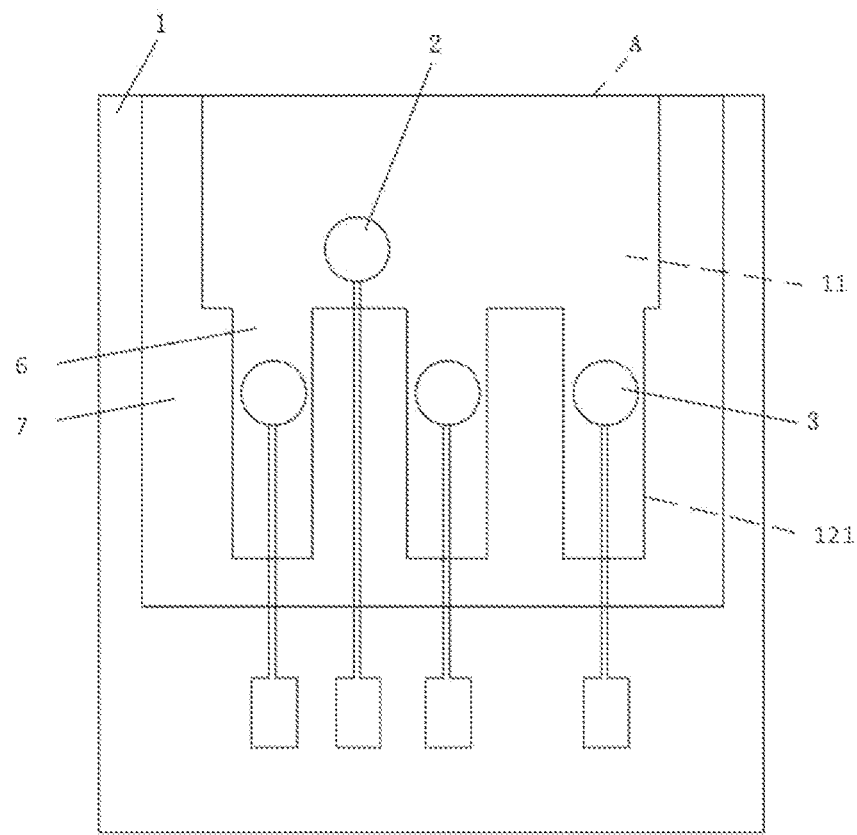
FIG. 22 is a schematic diagram of a top view structure of a sensor array device provided by Solution II of the present application.

As shown in FIG. 22, FIG. 22 shows a sensor array device disclosed by the embodiment of the present application, including a substrate 1 and electrodes arranged on the substrate 1. The sensor array device disclosed by the embodiment of the present application is mainly intended to detect various compositions in a liquid.

Specifically, the substrate 1 can be made from a polyester resin material or a polyimide material.

As shown in FIG. 22, the electrodes include a power electrode 2 and a plurality of working electrodes 3. The power electrode 2 serves to form a circuit and stabilize the potential. The power electrode 2 and the working electrodes 3 all have signal ends (round regions in FIG. 22), leads (linear regions in FIG. 22) and output ends (rectangular regions in FIG. 22), where after receiving the electric signals, the signal ends can transmit the electric signals to the output ends and finally output the electric signals to an analytical device connected to the sensor. Moreover, the surface of the signal end of each working electrode 3 has a specific enzyme, the specific enzyme can react with a corresponding analyte in the liquid to be tested to generate a product, and the product will be subjected to an oxidation reaction or a reduction reaction on the working electrode 3 on the corresponding sensor to change the electric signal; meanwhile, the specific enzymes on the working electrodes 3 are different, and thus, various compositions in the liquid to be tested can be detected by means of one sensor, so that the detection efficiency of the sensor can be effectively improved, and the detection efficiency of the sensor can be effectively improved. Of course, one composition can be also detected by means of the sensor, and thus, the sensors of the plurality of working electrodes 3 all will change the electric signals, so that the calculated statistical detection result is more accurate.

As shown in FIG. 22, the substrate 1 has a reaction region A, and the signal end of the power electrode 2 and the signal ends of the plurality of working electrodes 3 are in the reaction region A on the substrate 1. The reaction region A includes the first region 11 and the second region. The second region includes the plurality of sub-regions 121 independent of each other, the sub-regions 121 are the same as the working electrodes 3 in quantity, and the sub-regions 121 all are communicated with the first region 11.

Specifically, the power electrode 2 is located in the first region 11, and the plurality of working electrodes 3 are located in different sub-regions 121. It is to be noted that the first region 11 and the second region are not specific spaces formed on the substrate 1 but a kind of division of the substrate 1 itself. The sizes of the first region 11 and the second region are set according to an actual demand. The sub-regions 121 can be either same or different in size.

Figure 23:
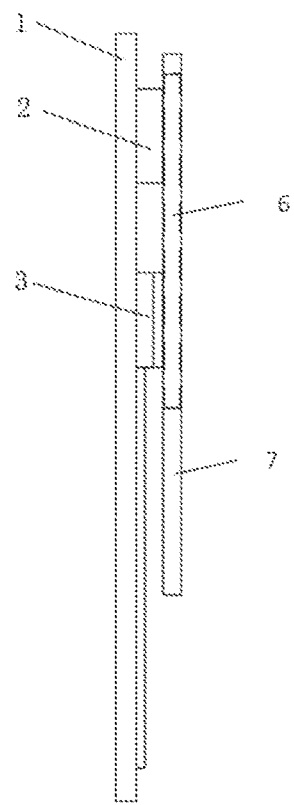
FIG. 23 is a schematic diagram of a side structure of a sensor array device provided by Solution II of the present application.

As shown in FIG. 22 and FIG. 23, the sensor further includes a hydrophilic layer 6 and a hydrophobic layer 7. The hydrophilic layer 6 is arranged on the substrate 1 and fully covers the reaction region A. That is to say, the shape of the entire hydrophilic layer 6 is the same as the shape of the reaction region A, and the area of the hydrophilic layer 6 further corresponds to the area including the reaction region A. The hydrophilic layer 6 is hydrophilic, and after the liquid to be tested is dropped to the hydrophilic layer 6, the liquid to be tested will diffuse on the hydrophilic layer 6.

Figure 24:
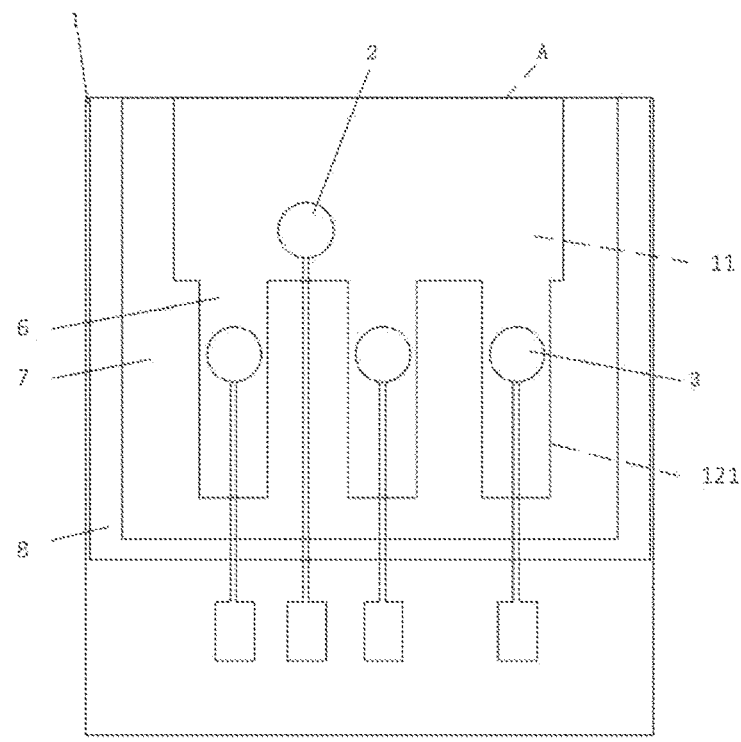
FIG. 24 is a schematic diagram of a top view structure of another sensor array device provided by Solution II of the present application.

The hydrophobic layer 7 is also arranged on the substrate 1 and the hydrophilic layer 6 is surrounded by the hydrophobic layer 7. That is, the periphery of the reaction region A is covered with the hydrophobic layer 7, and the hydrophobic layer 7 is hydrophobic and can prevent the liquid to be tested from flowing. Moreover, as shown in FIG. 24, positions between the sub-regions are filled with the hydrophobic layers 7.

During detection by means of the sensor, the liquid to be tested enters the hydrophilic layer 6 located in the first region 11 from an edge of the hydrophilic layer 6 superposed with the substrate 1. Due to hydrophilicity of the hydrophilic layer 6, the liquid to be tested will diffuse the hydrophilic layer 6 and finally diffuse to each sub-region 121. At this time, when the liquid to be tested diffuses to the position of the signal end of each working electrode 3, corresponding compositions in the liquid to be tested will react with the different specific enzymes on each working electrode 3, and the products generated by the specific enzymes and the corresponding compositions in the liquid to be tested will make the working electrodes 3 generate the electric signals, so that various compositions in the liquid to be tested are detected. Of course, when there are no compositions reacted with certain specific enzymes in the liquid to be tested, the corresponding working electrodes 3 will not generate the electric signals.

As the working electrodes 3 are located in different sub-regions, the sub-regions are independent of each other, and the hydrophobic layers 7 are arranged between the sub-regions, the products generated from the reactions by the specific enzymes cannot directly move to the location of another working electrode 3, so that interferences between the different working electrodes 3 are reduced, and the accuracy of sensor detection is improved.

In an embodiment, the material of the hydrophilic layer 6 can be silane with carboxyl and the hydrophilic layer can be directly formed on the substrate 1 by means of a printing technology.

In other embodiments, the surface of the substrate 1 can further be treated with an oxygen plasma, so that the surface of the substrate 1 generates OH radicals, and the hydrophilic layer 6 is formed on the surface of the substrate 1.

In an embodiment, the material of the hydrophobic layer 7 can be fluorine- or chlorine-containing silane, and the hydrophobic layer can be directly formed on the substrate 1 by means of the printing technology.

In other embodiments, the hydrophobic layer 7 can further be an insulating paste, for example, epoxy resin or polyvinylidene fluoride, and printed onto the substrate 1 by means of screen printing.

Figure 25:
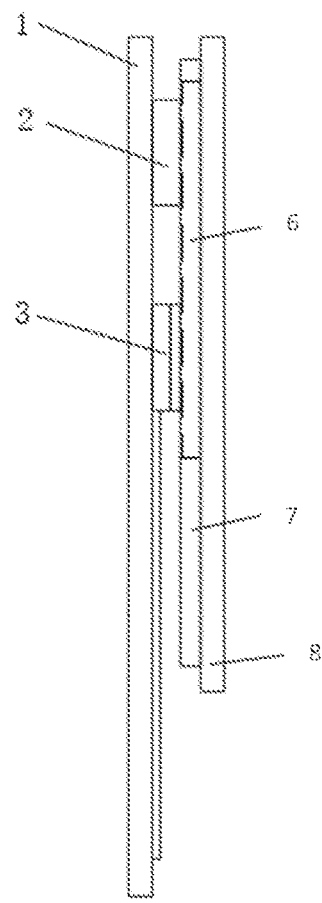
FIG. 25 is a schematic diagram of a side structure of a sensor array device provided by Solution II of the present application.

In an embodiment, as shown in FIG. 24 and FIG. 25, a protective layer 8 is arranged on the substrate 1, the protective layer 8 is parallel to the substrate 1, the spacing between the protective layer 8 and the substrate 1 is 0.2-3 mm, the protective layer 8 is covered with the hydrophilic layer 6 and the hydrophobic layer 7, and the protective layer 8 can play an isolating and protecting role to the entire sensor array device. The protective layer 8 can be made from a PET material or a PI material.

Connection between the protective layer 8 and the substrate 1 can be achieved by adhesive tape bonding. During connecting, adhesive tapes only need to be arranged on two sides of the protective layer 8, and the adhesive tapes can be either on the left and right sides of the protective layer or on the upper and lower sides of the protective layer.

Figure 26:
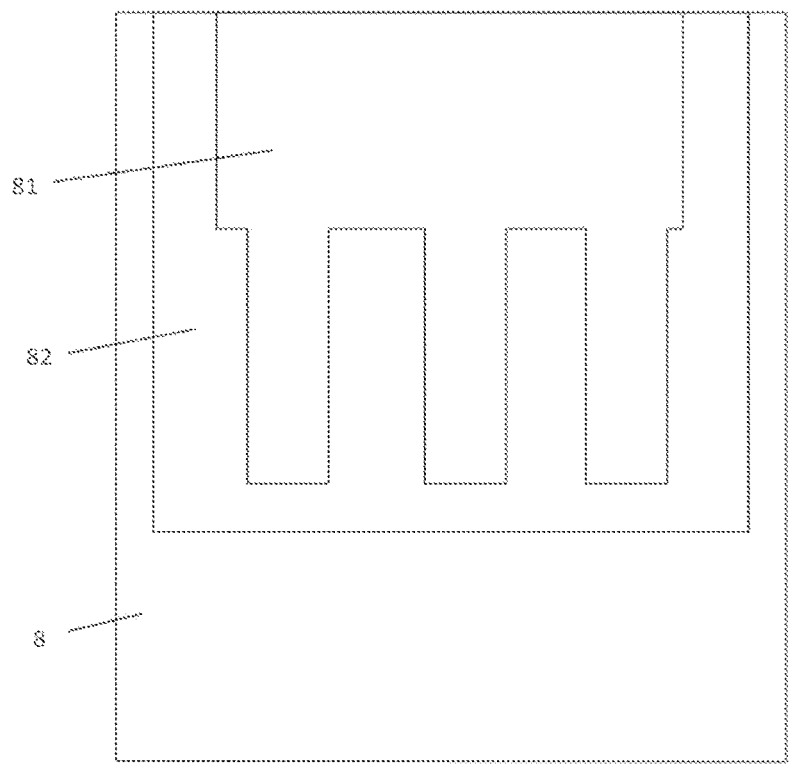
FIG. 26 is a schematic diagram of a top view structure of a protective layer of a sensor array device provided by Solution II of the present application.

As shown in FIG. 26, the protective layer 8 has a hydrophilic area 81 as same as the hydrophilic layer in pattern and a hydrophobic area 82 as same as the hydrophobic layer in pattern. The hydrophilic area 81 can be made from hydrophilic ink or paste, for example, silane with carboxyl, and is directly formed on the protective layer 8 by means of printing or screen printing, and the surface of the protective layer 8 can be further treated with oxygen plasma, so that the hydrophilic area 81 is formed on the surface of the protective layer 8. The hydrophobic area 82 can be made from hydrophobic ink or insulating paste, for example, fluorine- or chlorine-containing silane or epoxy resin, and is directly formed on the protective layer 8 by means printing or screen printing.

There are two circumstances for the power electrode 2.

Figure 27:
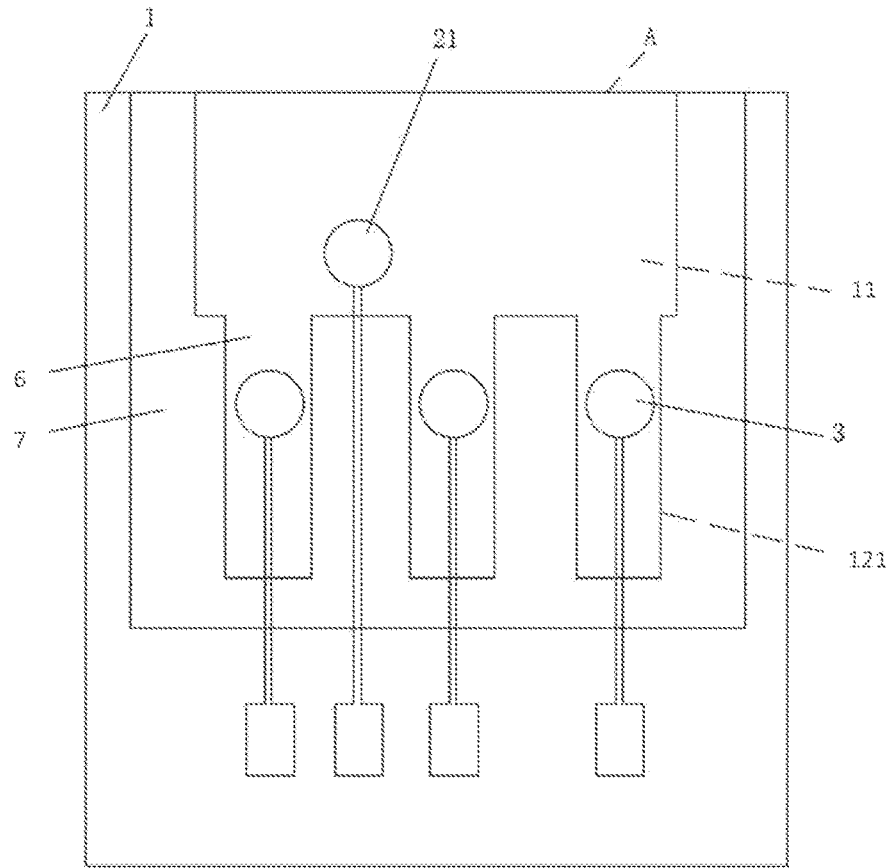
FIG. 27 is a schematic diagram of a top view structure of a sensor array device provided by Solution II of the present application.

As shown in FIG. 27, under the first circumstance, the power electrode 2 only includes the counter electrode 21, which can simultaneously serves to form a circuit and stabilize the potential. At this time, a material for the counter electrode 21 is Ag/AgCl, where the ratio of silver to silver chloride is 1:1, 6:4 or 7:3.

Figure 30:
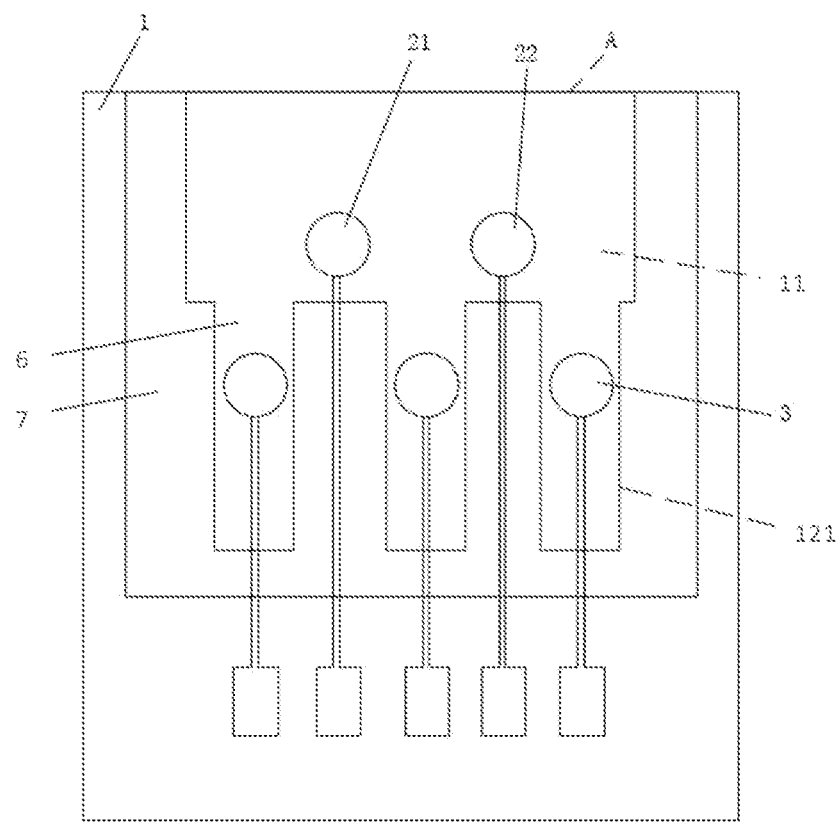
FIG. 30 is a schematic diagram of a top view structure of another sensor array device provided by Solution II of the present application.

As shown in FIG. 30, under the second circumstance, the power electrode 2 includes the counter electrode 21 and the reference electrode 22, where the counter electrode 21 serves to form a circuit and the reference electrode 22 serves to stabilize the potential. At this time, a material for the counter electrode 21 is the same as the material for the working electrode 3.

An electrode material for the reference electrode 22 is Ag/AgCl, where the ratio of silver to silver chloride is 1:1, 6:4 or 7:3.

The plurality of working electrodes 3 are located on one side of two sides of the power electrode 2; or, the plurality of working electrodes 3 are evenly spaced along the circumference of the power electrode 2.

In an embodiment, as shown in FIG. 27, the power electrode 2 only includes the counter electrode 21. There are totally three working electrodes 3. The electrode detecting ends of the three working electrodes 3 are located on the same straight line on the substrate 1, and correspondingly, three sub-regions 121 are formed on the substrate 1. Each sub-region 121 is strip-like, and the three strip-like sub-regions 121 are parallel to each other.

Figure 28:
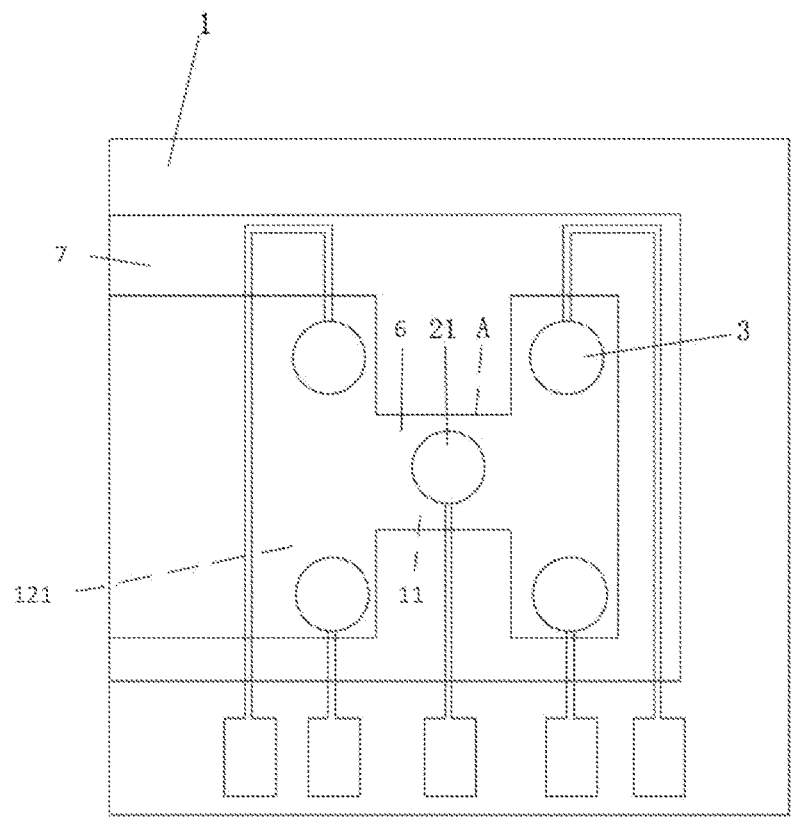
FIG. 28 is a schematic diagram of a top view structure of another sensor array device provided by Solution II of the present application.

In an embodiment, as shown in FIG. 28, the power electrode 2 only includes the counter electrode 21. There are totally four working electrodes 3, and the four working electrodes 3 are located on two sides of the counter electrode 21, respectively.

Figure 29:
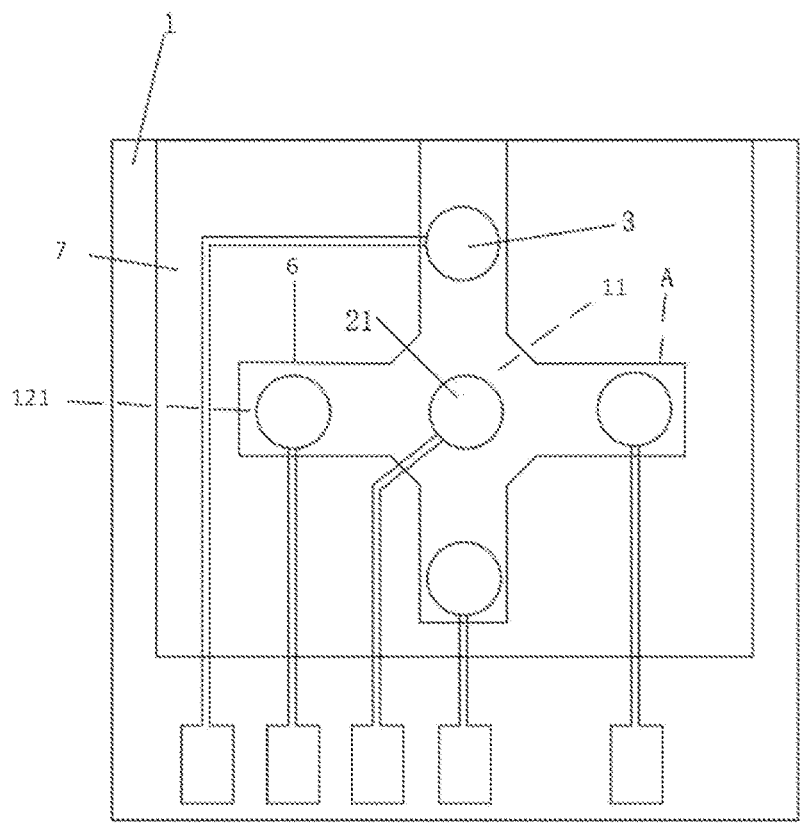
FIG. 29 is a schematic diagram of a top view structure of another sensor array device provided by Solution II of the present application.

In an embodiment, as shown in FIG. 29, the power electrode 2 only includes the counter electrode 21. There are totally four working electrodes 3, and the four working electrodes 3 are evenly distributed along the circumference of the counter electrode 21.

In an embodiment, as shown in FIG. 30, the power electrode 2 includes the counter electrode 21 and the reference electrode 22. There are totally three working electrodes 3. The three working electrodes 3 are located on the same horizontal straight line on the substrate 1, and correspondingly, three sub-regions 121 are formed on the substrate 1. Each sub-region 121 is strip-like, and the three strip-like sub-regions 121 are parallel to each other.

Figure 31:
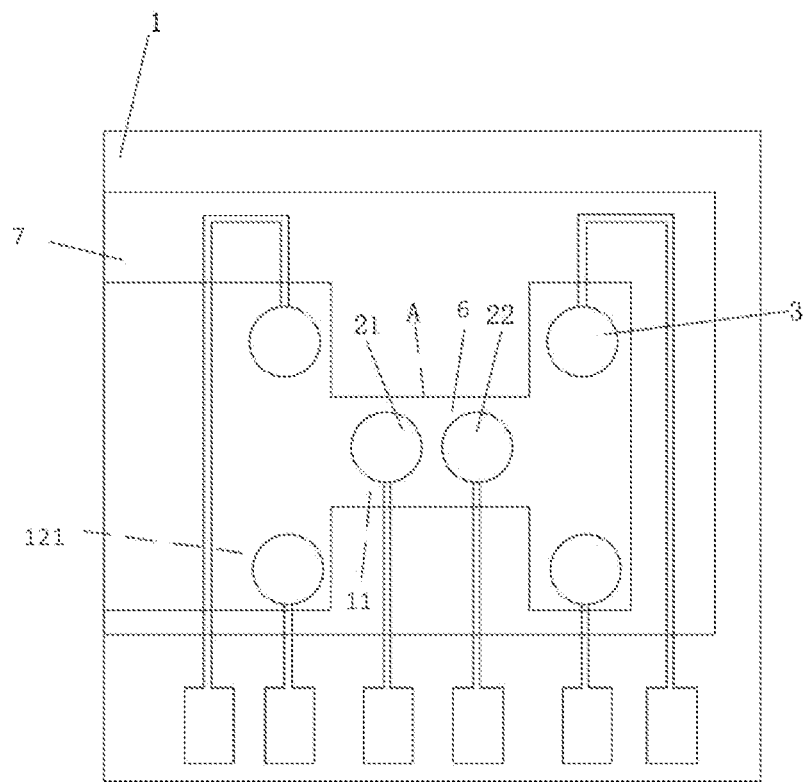
FIG. 31 is a schematic diagram of a top view structure of another sensor array device provided by Solution II of the present application.

In an embodiment, as shown in FIG. 31, the power electrode 2 includes the counter electrode 21 and the reference electrode 22. There are totally four working electrodes 3, and the four working electrodes 3 are located on two sides of the counter electrode 21 and the reference electrode 22, respectively.

Figure 32:
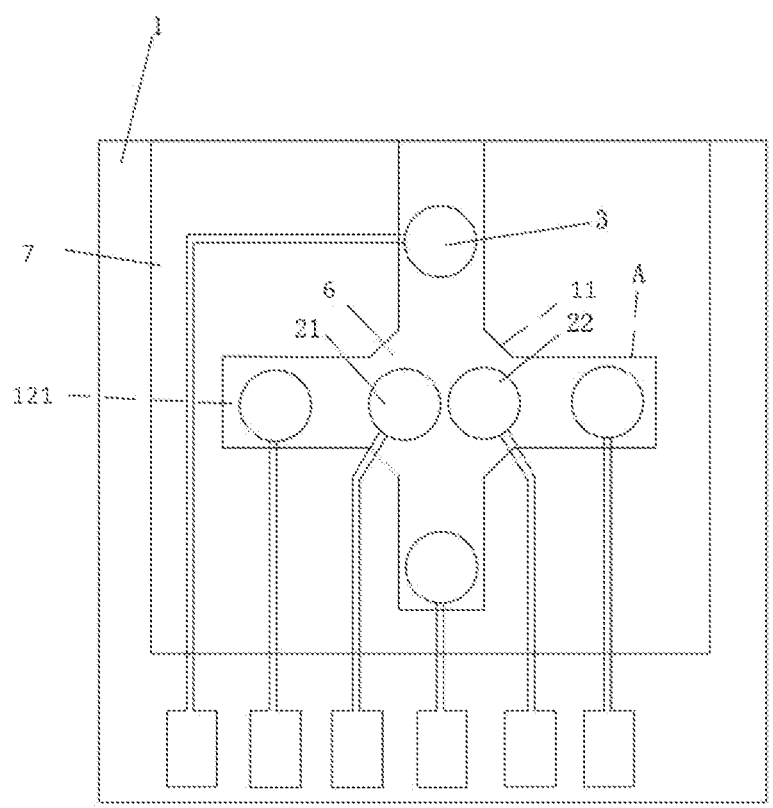
FIG. 32 is a schematic diagram of a top view structure of another sensor array device provided by Solution II of the present application.

In an embodiment, as shown in FIG. 32, the power electrode 2 includes the counter electrode 21 and the reference electrode 22. There are totally four working electrodes 3, and the four working electrodes 3 are evenly distributed along the circumstances of the counter electrode 21 and the reference electrode 22.

Embodiment IV

Figure 33:
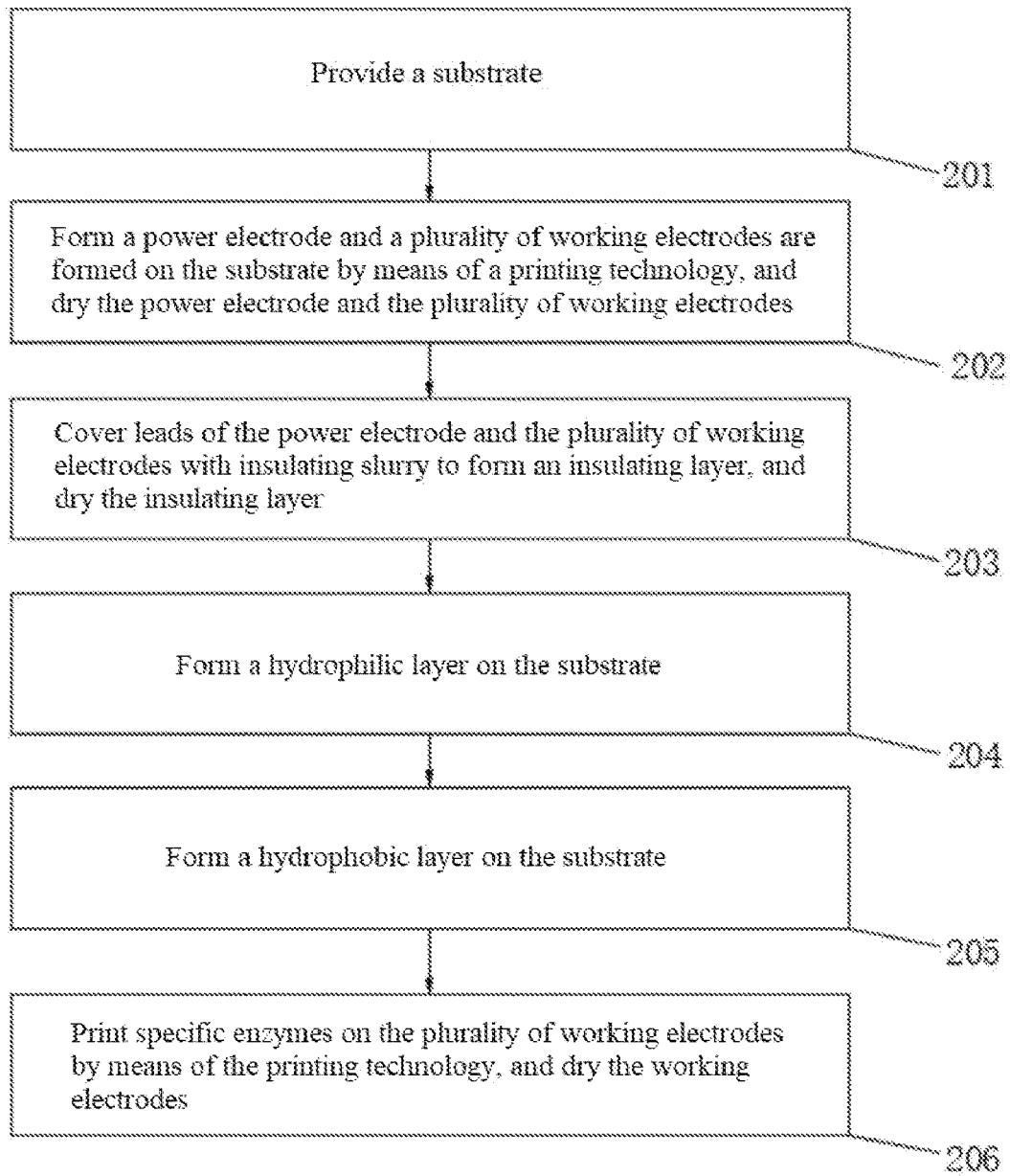
FIG. 33 is a step flowchart of a method for manufacturing a sensor array device provided by Solution II of the present application.

FIG. 33 shows a method for manufacturing a sensor array device. As shown in FIG. 33, the embodiment of the present application provides a method for manufacturing a sensor array device, including:

S201: a substrate 1 is provided.

S202: a power electrode 2 and a plurality of working electrodes 3 are formed on the substrate 1 by means of a printing technology, and the power electrode and the plurality of working electrodes are dried, where a signal end of the power electrode 2 and signal ends of the plurality of working electrodes 3 are located in a first region and a second region of the substrate, respectively.

Specifically, the printing technology can be screen printing. During the printing process of the power electrode 2 and the working electrodes 3, an arrangement mode and positions of the power electrode 2 and the working electrodes 3 can be set as required, and drying can be hot air drying. The reaction region A includes a first region 11 and a second region 12, the second region 12 includes a plurality of sub-regions independent of each other, the power electrode 2 is located in the first region 11, and the plurality of working electrodes 3 are located in different sub-regions, respectively.

S203: the leads of the power electrode 2 and the plurality of working electrodes 3 are covered with insulating paste to form an insulating layer 5, and the insulating layer is dried.

Specifically, the insulating paste can be epoxy resin or polyvinylidene fluoride, and the insulating layer 5 acts as a protection for the electrodes.

S204: a hydrophilic layer 6 is formed on the substrate 1 and covers the reaction region A.

Specifically, the hydrophilic layer 6 is carboxyl-containing silane and is formed on the substrate 1 by means of the printing technology, and the hydrophilic layer 6 fully covers the reaction region A of the substrate.

For the hydrophilic layer, the surface of the substrate 1 can further be treated with oxygen plasma, so that the surface of the substrate 1 generates OH radicals, and the hydrophilic layer 6 is formed on the surface of the substrate 1.

S205: a hydrophobic layer 7 is formed on the substrate 1, where the hydrophilic layer 6 is surrounded by the hydrophobic layer 7.

Specifically, the hydrophobic layer 7 can be made from hydrophobic ink or the insulating paste, for example, fluorine- or chlorine-containing silane or epoxy resin, and formed on the substrate 1 by means of a printing technology or a screen printing technology, and the hydrophilic layer 6 is surrounded by the hydrophobic layer 7, i.e., the reaction region A is surrounded by the hydrophobic layer 7.

S206: specific enzymes are printed on the plurality of working electrodes 3 by means of the printing technology, and the working electrodes are dried.

Figure 34:
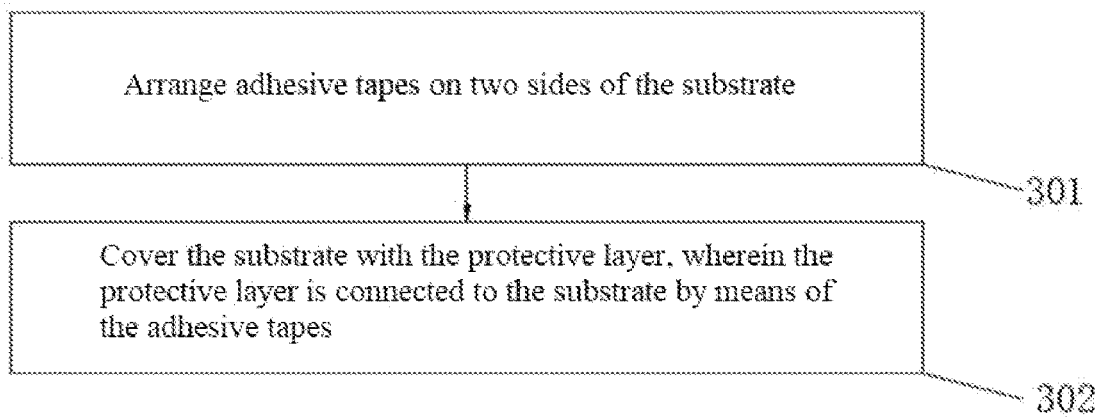
FIG. 34 is a step flowchart of a method for manufacturing a guide layer provided by Solution II of the present application.

In an embodiment, as shown in FIG. 34, after the hydrophobic layer 7 is formed on the substrate 1, the method further includes:

S301: adhesive tapes are arranged on two sides of the substrate 1.

Specifically, the adhesive tapes are 5 mm long, and the adhesive tapes on the two sides are parallel to each other.

S302: the substrate 1 is covered with the protective layer 8, and the protective layer 8 is connected to the substrate 1 by means of the adhesive tapes.

Specifically, the protective layer 8 is made of a plastic material, for example, a PET film or a PI film.

Finally, it shall be noted that the above embodiments are only used to explain the technical solution of the present invention and shall not be construed as a limitation thereto. Although the present invention is described in detail with reference to preferred embodiments, those of ordinary skill in the art shall understand that they still can modify or equivalently substitute the technical solution of the present invention. These modifications or equivalent substitutions do not deviate the modified technical solution from the spirit and scope of the technical solution of the present invention.

What is claimed is:

1. A sensor array device configured to reduce mutual interference when detecting different analytes to improve the accuracy of sensor detection, comprising:
   a substrate,
   electrodes arranged on the substrate, and
   a guide layer or a hydrophilic layer,
   wherein the electrodes comprise a power electrode and a plurality of working electrodes, wherein the power electrode is located in a first region of the substrate; the plurality of working electrodes are located in a second region of the substrate; surfaces of the plurality of working electrodes have various specific enzymes, respectively, and the specific enzymes on the surfaces of the plurality of working electrodes are different; and
   the second region comprises a plurality of sub-regions, wherein the plurality of sub-regions are independent of each other on the substrate, and the plurality of working electrodes are located in the plurality of sub-regions, respectively;
   a guide layer or a hydrophilic layer receives the liquid, guides the liquid to diffuse towards a predetermined position and prevents diffusion to other locations, ensuring the products generated by the reactions with the specific enzymes cannot move directly to the location of another working electrode to reduce interference between the different working electrodes when detecting different analytes;
   the guide layer is made of a paper material, is located above the electrodes and covers the first region and the second region, and an edge of the guide layer extends to an edge of the substrate;
   the hydrophilic layer is arranged on the substrate and covers the first region and the second region, and an edge of the hydrophilic layer extends to the edge of the substrate; and
   the hydrophilic layer is surrounded by a hydrophobic layer, and the hydrophobic layer is arranged on the substrate.

2. The sensor array device according to claim 1, wherein the plurality of working electrodes are located on one side or two sides of the power electrode; or the plurality of working electrodes are evenly spaced along a circumference of the power electrode.

3. The sensor array device according to claim 1, wherein the power electrode comprises a counter electrode.

4. The sensor array device according to claim 1, wherein the power electrode comprises a counter electrode and a reference electrode.

5. The sensor array device according to claim 1, wherein the guide layer is made of filter paper, chromatography paper or blotting paper.

6. The sensor array device according to claim 1, wherein a width of the guide layer located in the second region is 10 µm-5 mm.

7. The sensor array device according to claim 1, wherein a material of the hydrophilic layer comprises carboxyl-containing silane.

8. The sensor array device according to claim 1, wherein a material of the hydrophobic layer comprises fluorine- or chlorine-containing silane, or insulating paste.

9. The sensor array device according to claim 1, further comprising:
  a protective layer, wherein the protective layer covers the hydrophilic layer and the hydrophobic layer, and two sides of the protective layer are connected to the substrate.

10. A method for manufacturing a sensor array device, comprising:
  providing a substrate;
  forming a power electrode and a plurality of working electrodes on the substrate by a printing technology, and drying the power electrode and the plurality of working electrodes;
  covering leads of the power electrode and the plurality of working electrodes with insulating paste to form an insulating layer, and drying the insulating layer;
  printing specific enzymes on the plurality of working electrodes by the printing technology, and drying the plurality of working electrodes; and
  covering the power electrode and the plurality of working electrodes with a guide layer, wherein the guide layer is in a first region and is located in each sub-region of a second region; wherein the guide layer is a porous material, and the guide layer covering the working electrodes is formed in a pattern to make each sub-region independent of each other.

11. The method for manufacturing the sensor array device according to claim 10, the guide layer is processed by means of an etching or shearing process to configure the shape of the guide layer the same as the shape formed by the first region and the second region.

12. A method for manufacturing a sensor array device, comprising:
  providing a substrate;
  forming a power electrode and a plurality of working electrodes on the substrate by a printing technology, and drying the power electrode and the plurality of working electrodes, wherein the power electrode and the plurality of working electrodes are located in a first region and a second region of the substrate, respectively;
  covering leads of the power electrode and the plurality of working electrodes with insulating paste to form an insulating layer, and drying the insulating layer;
  forming a hydrophilic layer in a pattern on the substrate, wherein the hydrophilic layer covers the first region and each sub-region of the second region, and an edge of the hydrophilic layer extends to an edge of the substrate;
  forming a hydrophobic layer in a pattern on the substrate, wherein the hydrophilic layer is surrounded by the hydrophobic layer;
  printing specific enzymes on the plurality of working electrodes by the printing technology, and drying the plurality of working electrodes; and
  forming a protective layer that has a hydrophilic area the same as the hydrophilic layer in the pattern on the substrate and a hydrophobic area the same as the hydrophobic layer in the pattern on the substrate.

13. The method for manufacturing the sensor array device according to claim 12, wherein the hydrophobic layer can be processed by means of the printing technology, and the hydrophilic layer can be processed with oxygen plasma or printing technology.

* * * * *